United States Patent [19]

Takemoto et al.

[11] Patent Number: 5,167,729
[45] Date of Patent: Dec. 1, 1992

[54] SOLDERING FLUX

[75] Inventors: Masanori Takemoto, Anjo; Tatsushi Onishi, Hyogo; Masami Aihara, Kakogawa, all of Japan

[73] Assignees: Nippondenso Co., Ltd., Kariya; Harima Chemicals, Inc., Hyogo, both of Japan

[21] Appl. No.: 667,409

[22] PCT Filed: Aug. 8, 1990

[86] PCT No.: PCT/JP90/01013
§ 371 Date: May 15, 1991
§ 102(e) Date: May 15, 1991

[87] PCT Pub. No.: WO91/01844
PCT Pub. Date: Feb. 21, 1991

[30] Foreign Application Priority Data

| Aug. 8, 1989 | [JP] | Japan | 1-205091 |
| Aug. 8, 1989 | [JP] | Japan | 1-205092 |
| Aug. 8, 1989 | [JP] | Japan | 1-205093 |
| Aug. 8, 1989 | [JP] | Japan | 1-205094 |
| Jul. 19, 1990 | [JP] | Japan | 2-190979 |

[51] Int. Cl.$^5$ .............................................. B23K 35/34
[52] U.S. Cl. .................................... 148/23; 148/24; 148/25
[58] Field of Search ............................. 148/23–25

[56] References Cited

U.S. PATENT DOCUMENTS

| 2,158,984 | 5/1939 | Lytle | 148/24 |
| 4,325,754 | 4/1982 | Mizuhara | 148/24 |
| 4,495,007 | 1/1985 | Zado | 148/25 |
| 4,919,731 | 4/1990 | Iyogi | 148/25 |
| 4,981,526 | 1/1991 | Kudo | 148/25 |

*Primary Examiner*—Peter D. Rosenberg
*Attorney, Agent, or Firm*—Cushman, Darby & Cushman

[57] ABSTRACT

Disclosed is a soldering flux which prevents a release of an active ion contained in an activator when exposed to a high-temperature atmosphere maintaining at a temperature higher than 80° C., for example, an atmosphere of an engine room of an automobile, and thus makes washing unnecessary. This soldering flux comprises, together with an activator, (1) a thermoplastic resin having a softening point not lower than 80° C., and/or (2) an epoxy group-containing compound, a radical-polymerizable unsaturated double bond-containing compound or a blocked isocyanate group-containing compound, or (3) a thermosetting resin composed of a carboxyl group-containing resin and an epoxy resin and/or a thermosetting resin containing carboxy and epoxy groups.

9 Claims, No Drawings

5,167,729

SOLDERING FLUX

TECHNICAL FILED

The present invention relates to a soldering flux.

BACKGROUND ART

In general, to coat a solder on a base metal, oxides and other stains on the surface of the metal are removed, and simultaneously, a re-oxidation of the metal surface during the soldering is prevented, to reduce the surface tension of the solder and improve the wettability of the melted solder with the metal surface, and for this purpose, a soldering flux is used.

As the soldering flux, usually a resin flux formed by incorporating an activator capable of removing an oxide film into a thermoplastic resin having a low softening point, such as rosin, is used.

However, where the soldered portion is exposed to a high-temperature atmosphere, for example, to an atmosphere of 80° C. as in an engine room of an automobile, if the flux comprising a thermoplastic resin having a softening point below about 70° C., such as rosin, the thermoplastic resin is melted and an active ion in the activator held in this thermoplastic resin is released to lower the electrically insulating property and cause a corrosion of the metal surface.

This problem has been resolved by washing and removing the residual flux after the soldering, but since flourocarbon or the like is used as the washing solvent, a problem arises of environmental pollution, and furthermore, the cost is increased by the use of the washing solvent and the washing step.

Therefore, a primary object of the present invention is to provide a soldering flux capable of maintaining the electrically insulating property without washing away the residual flux, i.e., without washing, even if used in a high-temperature atmosphere.

DISCLOSURE OF THE INVENTION

The inventors of the present invention carried out an investigation with a view to attaining the above object, and as a result, found that the above problem can be solved and the above object can be attained if the soldering flux is constructed as described below.

In accordance with the first aspect of the present invention, there is provided a soldering flux comprising at least (a) a thermoplastic resin having a softening point not lower than 80° C. and (b) an activator.

If the soldering flux of the first aspect of the present invention is used, the thermoplastic resin having a softening point not lower than 80° C. is not melted even if exposed to a relatively high temperature such as the temperature of an engine room of an automobile, and therefore, no active ion is released. Furthermore, even if a part of the thermoplastic resin is replaced with rosin, the thermoplastic resin forms a high temperature-resistant film on the surface of the flux and covers the residual rosin after the soldering. Accordingly, the active ion released from the activator, which is formed in a high-temperature atmosphere is enveloped, and a reduction of the electrically insulating property and the occurrence of corrosion can be prevented.

In accordance with the second aspect of the present invention, there is provided a soldering flux comprising (a) at least one member selected from the group consisting of epoxy group-containing compounds, unsaturated double bond-containing compounds and blocked isocyanate group-containing compounds and (b) an activator.

If the soldering flux of the second aspect of the present invention is used, even if the residual flux is not removed by washing, the epoxy group-containing compound, unsaturated double bond-containing compound or blocked isocyanate group-containing compound causes, under heating at the soldering step, an addition reaction with a halogen acid, which is the active ion of the activator contained in the flux residue, with the result that the activator is deactivated and the active ion in the flux residue eliminated, the resistance to reduction of the electrically insulating property and the corrosion resistance are not lowered, and the reliability is improved.

In accordance with the third aspect of the present invention, there is provided a soldering flux comprising (a) a thermoplastic resin having a softening point not lower than 80° C., (b) at least one member selected from the group consisting of epoxy group-containing compounds, unsaturated double bond-containing compounds and blocked isocyanate group-containing compounds, and (c) an activator.

The invention of the third aspect exerts functions of the inventions of both the first and second aspects.

In accordance with the fourth aspect of the present invention, there is provided a soldering flux comprising at least one thermosetting resin selected from the group consisting of a thermosetting resin compound of a mixture of a carboxyl group-containing resin and an epoxy resin and a thermosetting resin having a carboxyl group and an epoxy group, and an activator.

If the soldering flux of the fourth aspect of the present invention is used, by the reaction between the carboxyl group and epoxy group, the thermosetting resin component forms a tough crosslinked film at the termination of soldering, and even if the active ion released from the excessive activator is left in the film on the surface of the flux, since the epoxy group is contained in the film, this epoxy group reacts with the active ion to include the active ion in the film. Accordingly, even if the flux component remains, the reliability of the soldered portion can be improved without a lowering of the electrically insulating property or the corrosion resistance.

According to the present invention, even if the soldered portion is used in a high-temperature atmosphere without washing away the flux after soldering, an excellent electrically insulating property can be attained and the reliability of the soldered portion can be improved, and thus an excellent soldering flux can be provided according to the present invention. Furthermore, if the present invention is adopted, since it is not necessary to wash away the flux residue after soldering, the costs are reduced by the omission of the washing step, and environmental pollution by flourocarbon or the like can be prevented.

BEST MODE OF CARRYING OUT THE INVENTION

A thermoplastic resin having a softening point not lower than 80° C., which shows a durability at a high temperature, must be selected as the thermoplastic resin to be used in the invention of the first aspect.

The softening point is preferably lower than 230° C. This is because, if the softening point is higher than 230° C., the flowability of the flux at the flow soldering becomes poor. An acrylic resin and a styrene/maleic acid resin are preferably used, and to promote the activating action, preferably a resin having an acid value of at least 20 is used. Accordingly, a polymer obtained by polymerizing a monomer having a polymerizable unsaturated group, such as (meth)acrylic acids, esters thereof, crotonic acid, itaconic acid, maleic acid (anhydride), esters thereof, styrene, vinyltoluene, (meth)acrylonitrile, (meth)acrylamide, vinyl chloride or vinyl acetate in the presence of a peroxide catalyst or the like by radical polymerization such as bulk polymerization, solution polymerization, suspension polymerization or emulsion polymerization, is used.

Halogen acid salts of ethylamine, propylamine, diethylamine, triethylamine, ethylenediamine and aniline, and organic carboxylic acids such as lactic acid citric acid, stearic acid, adipic acid and diphenylacetic acid are preferably used as the activator.

In the first aspect of the present invention, a part of the thermoplastic resin can be replaced by rosin and/or a derivative heretofore used. As the rosin and/or the derivative, there are used ordinary gum, tall and wood rosin, and derivatives such as heat-treated rosin, polymerized rosin, hydrogenated rosin, formylated rosin, rosin ester, rosin-modified maleic acid resin, rosin-modified phenolic resin and rosin-modified alkyd resin. The rosin and/or the derivative is used as a binder for uniformly coating a metal activator.

Where the flux of the first aspect of the present invention is used in the liquid state, a solvent can be further added. A polar solvent capable of dissolving the thermoplastic resin, the activator, and further, the rosin component therein, to form a solution is preferably used, and usually, an alcoholic solvent is used. In view of the volatility and the activator-dissolving power, isopropyl alcohol is especially preferably used.

In the soldering flux of the first aspect of the present invention, the amount of the thermoplastic resin having a softening point not lower than 80° C. is preferably 0.5 to 80% by weight based on the total flux. If the amount of the thermoplastic resin is smaller than 0.5% by weight, the property of forming a film after soldering is reduced and the high-temperature durability becomes poor. If the amount of the thermoplastic resin is higher than 80% by weight, the viscosity of the flux per se increases and because of the film thickness of the flux, a problem arises of a reduction of the soldering property. Preferably the amount of the activator used in the present invention is 0.1 to 20% by weight based on the total flux. If the amount of the activator is smaller than 0.1% by weight, the activating power becomes too low and the soldering property becomes poor. If the amount of the activator is larger than 20% by weight, the film-forming property of the flux is reduced and the hydrophilic property is increased, and the corrosion resistance and the electrically insulating property become poor. When a solvent is added to the flux of the present invention, for using the flux in the liquid state, the solvent is preferably used in an amount of 20 to 90% by weight based on the total flux. If the amount of the solvent is smaller than 20% by weight, the viscosity of the flux is increased and the coating property of the flux becomes poor. If the amount of the solvent exceeds 99% by weight, the amounts of the effective flux components (the thermoplastic resin and the like) are reduced and the soldering property becomes poor.

As the epoxy group-containing compound used in the second aspect of the present invention, there can be mentioned phenolic glycidyl compounds of the bisphenol, novolak, alkylphenol and resorcinol types, polyhydric alcohol glycidyl compounds, ester glycidyl compounds, alicyclic epoxides, epoxidized polybutadiene, epoxidized glycerides and epoxidized fatty acids. Moreover, there can be mentioned epoxy compounds modified with the foregoing compounds. Preferably, a compound having at least two epoxy groups in the molecule and capable of elevating the melting point of the flux residue by reaction with a carboxylic acid such as rosin when rosin or the like is contained is used.

As the radical-polymerizable unsaturated double bond-containing compound used in the second aspect of the present invention, there can be mentioned (meth)acrylic acid, esters thereof, (meth)acrylonitrile, (meth)acrylamide, vinyl acetate, styrene, vinyltoluene, divinylbenzene, vinylnaphthalene, vinylpyrrolidone, maleic acid, esters thereof, (meth)allyl alcohol, esters thereof, coumarone, indene, dicyclopentadiene, polybutadiene, linoleic acid, and resins modified with these compounds. If a large amount of the compound of this type remains in the original form in the residue after soldering, the durability is degraded by softening or the like. Accordingly, a compound, at least 80% by weight of which volatilizes and dissipates under heating at the soldering step, or a compound, the molecular weight or melting point of which is increased by a thermal change such as polymerization, is preferably used.

As the blocked isocyanate group-containing compound used in the second aspect of the present invention, there can be mentioned isocyanate monomers such as tolylene diisocyanate, diphenylmethane diisocyanate, hexamethylene diisocyanate and isophorone diisocyanate, and reaction products of polymers or isocyanate prepolymers such as polyhydric alcohol adducts with active hydrogen-containing compounds such as phenol, cresol, amines, alcohols, lactams and oximes. In view of the low volatility and low toxicity, a blocked compound of an isocyanate prepolymer is preferably used.

As the activator used in the second aspect of the present invention, there can be mentioned halogen acid salts of ethylamine, propylamine, diethylamine, triethylamine, ethylenediamine and aniline. The activator is necessary for cleaning the metal surface.

Rosin resins such as wood rosin, gum rosin, tall rosin, disproportionated rosin, hydrogenated rosin, polymerized rosin and modified rosin, and thermoplastic and thermosetting synthetic resins such as a polyester resin, an acrylic resin, a urethane resin, an epoxy resin and a phenolic resin, which are customarily used, can be incorporated in the soldering flux of the second aspect of the present invention. Organic acids such as lactic acid, citric acid, stearic acid, adipic acid and benzoic acid can be used for promoting the activating action. Where the flux is used in a liquid state. an alcoholic solvent such as isopropyl alcohol or butyl carbitol, an ester solvent such as ethyl acetate a hydrocarbon solvent such as toluene and a ketone solvent such as methylethylketone can be used.

In the second aspect of the present invention, the amount of the epoxy group-containing compound, radical-polymerizable uncaturated double bond-containing compound or blocked isocyanate group-containing compound is preferably 1 to 70% by weight based on the total soldering flux. If the amount of the above compound is smaller than 1% by weight, it is impossible to sufficiently deactivate the active ion in the activator, and a problem of a lowering of the corrosion resistance or of the insulating property arises. If the amount of the above compound is larger than 70% by weight, the viscosity of the flux per se is increased and the coating property of the flux becomes poor, and the thickness of the flux coating tends to increase, and the soldering property becomes poor. Moreover, there arises a problem of a reduction of the compatibility with the activator. The amount of the activator is preferably 0.1 to 30% by weight. If the amount of the activator is smaller than 0.1% by weight, the activating power is too low and the soldering property becomes poor. If the amount of the activator is larger than 30% by weight, the film-forming property of the flux becomes poor, and simultaneously, the moisture-absorbing property is increased, resulting in a lowering of the insulating property.

In the third aspect of the present invention, a combination of (a) the thermoplastic resin having a softening point not lower than 80° C., used in the first aspect, and (b) at least one member selected from the group consisting of epoxy group-containing compounds, unsaturated double bond-containing compounds, and blocked isocyanate group-containing compounds, used in the second aspect, is used. In the soldering flux used in the third aspect of the present invention, the amount of the thermoplastic resin (a) having a softening point not lower than 80° C. is preferably 0.5 to 80 % by weight based on the entire flux. If the amount of the thermoplastic resin (a) is smaller than 0.5% by weight, the film property after soldering is lowered and the high-temperature durability becomes poor. If the amount of the thermoplastic resin (a) is larger than 80% by weight, the viscosity of the flux per se is increased and the soldering property is lowered because of the increase of the flux thickness. In the third aspect of the present invention, the compound (b) is preferably used in an amount of at least 1% by weight. If the amount of the compound (b) is smaller than 1% by weight, the effect of deactivating the activator is poor, and the corrosion resistance and the electrically insulating property cannot be maintained at required levels. In the third aspect of the present invention, the activator is preferably used in an amount of 0.1 to 30% by weight based on the entire flux. If the amount of the activator is smaller than 0.1% by weight, the activating power is too low and the soldering property becomes poor. If the amount of the activator is larger than 30% by weight, the film-forming property of the flux becomes poor and the hydrophilic property becomes strong, and the corrosion resistance and insulating property becomes poor. Where a solvent is added for using the flux of the third aspect of the present invention in a liquid state, preferably the solvent is added in an amount of 20 to 99% by weight based on the entire flux. If the amount of the solvent is smaller than 20% by weight, the viscosity of the flux becomes too high and the coating property of the flux becomes poor. If the amount of the solvent is larger than 99% by weight, the amount of the effective component (thermoplastic resin or the like) of the flux is too small and the soldering property becomes poor.

In the forth aspect of the present invention, an acrylic resin, a polyester resin, a urethane resin, an epoxy ester resin and a phenolic resin can be used as the carboxyl group-containing resin. In view of the resistance to a reduction of the insulating property, the hardenability and the compatibility, an acrylic resin is most preferably used.

Aliphatic and aromatic epoxy resins can be used as the epoxy resin, and a liquid epoxy resin is preferably used because the liquid epoxy resin promotes the flowability of the flux.

As the resin containing epoxy and carboxyl groups, there can be mentioned a resin formed by reacting hydroxyl groups of an epoxy resin with a polybasic acid anhydride to form a half ester, and an acrylic resin formed by copolymerizing monomers including glycidyl methacrylate, acrylic acid and the like.

An activator known as a usual flux component, for example, a halogen acid salt of ethylamine, propylamine, diethylamine, triethylamine, ethylenediamine or aniline, or an organic acid such as lactic acid, citric acid, stearic acid or adipic acid, is added to the above-mentioned resin component.

when the flux is used in a liquid state, a solvent, for example, an alcoholic solvent such as ethyl alcohol, isopropyl alcohol, ethylcellosolve or butyl carbitol, an ester solvent such as ethyl acetate or butyl acetate, a hydrocarbon solvent such as toluene or terpene oil or a ketone solvent such as acetone or methylethylketone can be added.

In the fourth aspect of the present invention, a part of the thermosetting resin can be replaced by a thermoplastic resin, whereby the flowability and film-forming property of the flux at the soldering step can be controlled. In this case, as the thermoplastic resin, the resins to be used in the first aspect of the present invention can be used, and rosin and derivatives thereof such as polymerized rosin, hydrogenated rosin, disproportionated rosin, rosin-modified maleic acid resin, rosin-modified phenolic resin and rosin-modified alkyd resin can be used. The mixing ratio of the thermoplastic resin to the thermosetting resin is preferably up to about 80% by weight. If the mixing ratio of the thermoplastic resin is higher than 80% by weight. The characteristic properties of the thermosetting resin are lost.

In the soldering flux used in the fourth aspect of the present invention, the amount of the thermosetting resin is preferably 0.5 to 70% by weight based on the entire flux. If the amount of the thermosetting resin is smaller than 0.5% by weight, the active ion in the activator cannot be sufficiently deactivated and a problem arises concerning the corrosion resistance or the electrically insulating property. On the other hand, if the amount of the thermosetting resin is larger than 70% by weight, the viscosity of the flux per se is increased, the flux thickness is increased, and the coating property of the flux becomes poor. The amount of the activator is preferably 0.1 to 30% by weight based on the entire flux. If the amount of the activator is less than 0.1%, the activating power of the flux is too low and the soldering property becomes poor. If the amount of the activator is larger than 30% by weight, the film-forming property of the flux becomes poor, and therefore, the moisture-absorbing property is increased and a problem of a reduction of the electrically insulating property arises.

Examples

EXAMPLES 1 THROUGH 4

In Example 1, an acrylic resin was used as the thermoplastic resin having a softening point not lower than 80° C. More specifically, a styrene-acrylic resin having an acid value of 160 and a softening point of 130° C. was used in an amount of 11.1% by weight. Furthermore, disproportionated rosin was used in an amount of 7.4% by weight, and as the activator, there was used 1.2% by weight of adipic acid and 0.3% by weight of aniline hydrobromide. Moreover, 80% by weight of isopropyl alcohol was used as the solvent. These components were sufficiently dissolved and diffused to obtain a flux of Example 1, and the non-tackiness test, the spreading test, the insulation resistance test, the corrosion test, the solderability test, and the coating adhesion test were carried out. Note, the non-tackiness test, the spreading test, the insulation test, and the corrosion test were carried out according to JIS Z-3197. At the solderability test, a paper-phenolic resin substrate printed circuit board (90 mm × 135 mm) was soldered by a jet soldering apparatus and defects were checked by a visual observation. At the coating adhesion test, an acrylic coating material was coated on the soldered portion and subjected to the cold-heat cycle test (−30° C. × 30 minutes −25° C. × 30 minutes; 10 cycles), and peeling or cracking was checked by a visual observation.

The results obtained in Example 1 are shown in Table 1.

In Example 2, 11.1% by weight of an acrylic resin composed mainly of methyl methacrylate, which had an acid value of 130 and a softening point of about 120° C. was used as the thermoplastic resin. Other components were the same as those used in Example 1. The components were uniformly mixed and dissolved as in Example 1 to obtain a flux of Example 2. The tests were carried out in the same manner as described in Example 1, and the results are shown in Table 1.

In Example 3, 11.1% by weight of an acrylic resin composed mainly of isobutyl methacrylate, which had an acid value of 150 and a softening point of 110° C., was used as the thermoplastic resin. Other components were the same as those used in Example 1. The components were uniformly mixed and dissolved to obtain a flux of Example 3. The flux was subjected to the same tests as described in Example 1, and the results are shown in Table 1.

In Example 4, a styrene-maleic acid resin having an acid value of 150 and a softening point of 110° C. was used as the thermoplastic resin. Other components were the same as those used in Example 1. The components were uniformly mixed and dissolved to form a flux of Example 4. The flux was subjected to the same tests as described in Example 1, and the results are shown in Table 1.

COMPARATIVE EXAMPLE 1

A flux of Comparative Example 1 was prepared by uniformly mixing and dissolving 18.5% by weight of disproportionated rosin, 1.2% by weight of adipic acid as the activator, 0.3% by weight of hydrobromic anilide and 80.0% by weight of isopropyl alcohol as the solvent, and the flux was tested in the same manner as described in Example 1. The results are shown in Table 1.

TABLE 1

| | | Example No. 1 | Example No. 2 | Example No. 3 | Example No. 4 | Comparative Example No. 1 |
|---|---|---|---|---|---|---|
| Composition (% by weight) Flux | acrylic resin | 11.1 | 11.1 | 11.1 | — | — |
| | styrene-maleic acid resin | — | — | — | 11.1 | — |
| | disproportionated rosin | 7.4 | 7.4 | 7.4 | 7.4 | 18.5 |
| | adipic acid | 1.2 | 1.2 | 1.2 | 1.2 | 1.2 |
| | hydrobromic anilide | 0.3 | 0.3 | 0.3 | 0.3 | 0.3 |
| | isopropyl alcohol | 80.0 | 80.0 | 80.0 | 80.0 | 80.0 |
| Acid Value of Acrylic or Styrene-Maleic Acid Resin | | 160 | 130 | 160 | 150 | — |
| Softening Point (°C.) of Acrylic or Styrene-Maleic Acid Resin | | 130 | 120 | 110 | 110 | — |
| Main Componnent in Acrylic Resin | | styrene | methyl methacrylate | isobutyl methacrylate | — | — |
| Test Results | non-tackiness | slight cloth trace | slight cloth trace | slight cloth trace | slight cloth trace | large cloth trace |
| | Spreading ratio (%) | 93 | 92 | 94 | 93 | 93 |
| | insulation resistance (Ω) initial stage | $6 \times 10^{12}$ | $2 \times 10^{12}$ | $5 \times 10^{12}$ | $4 \times 10^{12}$ | $4 \times 10^{10}$ |
| | 50 hrs | $4 \times 10^{11}$ | $3 \times 10^{11}$ | $5 \times 10^{11}$ | $3 \times 10^{11}$ | $5 \times 10^{9}$ |
| | 500 hrs | $4 \times 10^{11}$ | $2 \times 10^{11}$ | $5 \times 10^{11}$ | $2 \times 10^{11}$ | $3 \times 10^{7}$ |
| | corrosion resistance 50 hrs | no corrosion | no corrosion | no corrosion | no corrosion | pitting corrosion |
| | 500 hrs | no corrosion | no corrosion | no corrosion | no corrosion | |
| | solderability (defect ratio, %) | below 1 | below 1 | below 1 | below 1 | below 1 |
| | adhesion to coating agent | no trouble | no trouble | no trouble | no trouble | cracking |

As apparent from the results shown in Table 1, the flux of the first aspect of the present invention has an excellent resistance to a reduction of the electrically insulating property and the corrosion resistance, compared to the conventional flux.

Furthermore, in Example 1 to 4, the rosin type flux component was extremely compatible with a thermoplastic resin having a high softening point, i.e. a softening point not lower than 80° C., few soldering defects were caused, the adhesion to the coating agent was good, and a cracking of the film did not occur even at a low temperature. Namely, a good flux was obtained.

Accordingly, the flux is very valuable as a soldering flux and the washing could be omitted, and therefore, the soldering cost was effectively reduced.

EXAMPLES 6 THROUGH 9

The following composition was adopted for the flux of Example 6. Polymerized rosin was used in an amount of 11.1% by weight based on the entire flux. A bisphenol type epoxy resin having an epoxy equivalent of 470 was used in an amount of 7.4% by weight as the epoxy group-containing compound. Furthermore, 1.2% by weight of adipic acid was used as the activator, and 0.3% by weight of propylamine, 50.0% by weight of propyl alcohol and 30.0% by weight of toluene were used. These components were uniformly mixed and dissolved, and a flux was obtained in the same manner as described in Example 1, and the insulation resistance, corrosion resistance and solderability of the flux were tested and the chlorine content in the residue was determined.

The insulation resistance and corrosion resistance were tested according to JIS Z-3197. At the solderability test, a paper-phenolic substrate (90 mm ×135 mm) and dissolved to obtain a flux, and the flux was tested in the same manner as described in Example 6. The results are shown in Table 2.

TABLE 2

|  |  | Example No. | | | | Comparative Example No. |
|---|---|---|---|---|---|---|
|  |  | 6 | 7 | 8 | 9 | 2 |
| Composition (% by weight) of Flux | polymerized rosin | 11.1 | 11.1 | 13.0 | 13.0 | 18.5 |
|  | bisphenol type epoxy resin having epoxy equivalent of 470 | 7.4 | — | — | — | — |
|  | acrylic resin having epoxy equivalent of 430 | — | 7.4 | — | — | — |
|  | blocked isocyanate | — | — | 5.5 | — | — |
|  | divinylbenzene | — | — | — | 5.5 | — |
|  | adipic acid | 1.2 | 1.2 | 1.2 | 1.2 | 1.2 |
|  | propylamine hydrochloride | 0.3 | 0.3 | 0.3 | 0.3 | 0.3 |
|  | toluene | 30.0 | 30.0 | 30.0 | 30.0 | 30.0 |
|  | isopropyl alcohol | 50.0 | 50.0 | 50.0 | 50.0 | 50.0 |
| Test Results | insulation resistance ($\Omega$) initial stage | $5 \times 10^{12}$ | $6 \times 10^{12}$ | $5 \times 10^{12}$ | $4 \times 10^{12}$ | $6 \times 10^{11}$ |
|  | after 50 hrs | $3 \times 10^{12}$ | $5 \times 10^{12}$ | $3 \times 10^{12}$ | $4 \times 10^{12}$ | $5 \times 10^{9}$ |
|  | after 500 hrs | $1 \times 10^{12}$ | $4 \times 10^{12}$ | $3 \times 10^{12}$ | $2 \times 10^{12}$ | $3 \times 10^{7}$ |
|  | corrosion resistance after 50 hrs | no corrosion | no corrosion | no corrosion | no corrosion | pitting corrosion |
|  | after 500 hrs | no corrosion | no corrosion | no corrosion | no corrosion |  |
|  | solderability (defect ratio, %) | below 1 | below 1 | below 1 | below 1 | below 1 |
|  | chlorine content (%) in residue before soldering | 0.53 | 0.54 | 0.53 | 0.54 | 0.54 |
|  | after soldering | 0.1> | 0.1> | 0.1> | 0.1> | 0.43 | was soldered by a flow soldering apparatus, and defects were checked by the visual observation. The chlorine content in the residue was determined according to JIS Z-3197 after extraction of soluble components with methanol. The results are shown in Table 2.

For the soldering flux of Example 7, polymerized rosin was used in an amount of 11.1% by weight based on the entire flux. An acrylic resin having an epoxy equivalent of 430 was used in an amount of 7.4% by weight as the epoxy group-containing compound. The activator and solvent were the same as those used in Example 6. The flux of Example 7 was prepared by uniformly mixing and dissolving these components, and the flux was tested in the same manner as in Example 6. The results are shown in Table 2.

For the soldering flux of Example 8, polymerized rosin was used in an amount of 13.0% by weight based on the entire flux. Crelan UI (blocked isocyanate supplied by Sumitomo-Bayer Urethane) was used in an amount of 5.5% by weight as the blocked isocyanate compound. The activator and solvent were the same as those used in Example 6. The flux of Example 8 was obtained by uniformly mixing and dissolving these components, and the flux was then tested in the same manner as in Example 6. The results are shown in Table 2.

For the soldering flux of Example 9, polymerized rosin was used in an amount of 18.0% by weight based on the entire flux and divinylbenzene was used in an amount of 5.5% by weight as the unsaturated double bond-containing compound, and the same activator and solvent as used in Example 6 were used. The flux of Example 9 was prepared by uniformly mixing and dissolving these components, and the flux was tested in the same manner as described in Example 6. The results are shown in Table 2.

COMPARATIVE EXAMPLE 2

Polymerized rosin was used in an amount of 18.5% by weight, and the same activator and solvent as used in Example 6 were used in the same amounts as used in Example 6. These components were uniformly mixed and dissolved to obtain a flux, and the flux was tested in the same manner as described in Example 6. The results are shown in Table 2.

From the results shown in Table 2, it is seen that the flux of the second aspect of the present invention was an excellent resistance to a reduction of the electrically insulating property and the corrosion resistance, compared to the conventional flux.

EXAMPLES 10 THROUGH 14

For the soldering flux of the third aspect of the present invention, in Example 10, an acrylic resin was used as the thermoplastic resin having a softening point not lower than 80° C. More specifically, a styrene-acrylic resin having an acid value of 130 and a softening point of 130° C. was used in an amount of 18.5% by weight, and 1.2% by weight of adipic acid and 0.3% by weight of propylamine hydrochloride were used as the activator. As the monomer having a radical-polymerizable unsaturated group, 2-ethylhexyl methacrylate, which is a kind of the methacrylic acid ester, was used in an amount of 4.8% by weight. These components were sufficiently dissolved and diffused in 75.2% by weight of isopropyl alcohol as the solvent to obtain a flux of the third aspect of the present invention, and the obtained flux was subjected to various tests, for example, for determining the non-tackiness, the spreading ratio, the insulation resistance, the corrosion resistance, and the chlorine content in the film. The non-tackiness test, the spreading ratio test, the insulation resistance test, and the corrosion test were conducted according to JIS Z-3197, and the chlorine content was determined according to JIS Z-3197, after an extraction of soluble components with methanol. At the solderability test, a paper-phenolic substrate (90 mm ×135 mm) was soldered by a jet soldering apparatus, and defects were checked by visual observation.

The results obtained in Example 10 are shown in Table 3.

In Example 11, 11.1 % by weight of a styrene-acrylic resin and 7.4% by weight of disproportionated rosin were used as the thermoplastic resin, and 1.2% by weight of adipic acid and 0.3% by weight of propylamine hydrochloride were used as the activator. As the monomer, 4.8% by weight of 2-ethylhexyl methacrylate was used, and 75.2% by weight of isopropyl alcohol was used as the solvent. These components were sufficiently and uniformly dissolved and diffused. The obtained flux was tested in the same manner as described in Example 10, and the results are shown in Table 3.

In Example 12, a flux was prepared in the same manner as described in Example 11, except that 4.8% by weight of benzyl methacrylate, which is a kind of the methacrylic acid ester, was used as the monomer, and the obtained flux was tested in the same manner as described in Example 10. The results are shown in Table 3.

In Example 13, a flux was prepared in the same manner as described in Example 11 except that 4.8% by weight of ethylene glycol dimethacrylate, which is a kind of the ester of methacrylic acid, was used as the monomer, and the obtained flux was tested in the same manner as described in Example 10. The results are shown in Table 3.

In Example 14, a flux was prepared in the same manner as described in Example 11 except that a styrene-maleic acid resin having an acid value of 150 and a softening point of 120° C. was used in an amount of 11.1% by weight as the thermoplastic resin, and the flux was tested in the same manner as described in Example 10. The results are shown in Table 3.

COMPARATIVE EXAMPLE 3

A flux was prepared in the same manner as described in Example 11 except that 18.5% by weight of disproportionated rosin was used as the thermoplastic resin and 80% by weight of isopropyl alcohol was used as the solvent, and the flux was tested in the same manner as described in Example 10. The results are shown in Table 3.

flux having superior various characteristics to those of the conventional flux can be provided.

Moreover, since Table 3 indicates that, when the flux of the present invention is used, the content of chlorine, a kind of the halogen, left in the film after soldering is lower than 0.1%, it is understood that the active ion (halogen) in the flux is sufficiently deactivated by monomer.

In the foregoing examples, an acrylic resin and a styrene-maleic acid resin are used as the thermoplastic resin having a softening point not lower than 80° C. Accordingly, the electrically insulating property and corrosion resistance can be maintained at high levels in a high-temperature atmosphere, and a remaining of the flux after soldering and cracking can be prevented even at a low temperature.

EXAMPLES 15 THROUGH 18

In Example 15, an acrylic resin having an acid value of 100 was used as the carboxyl group-containing resin in an amount of 11.1% by weight, and bisphenol A diglycidyl ether was used as the epoxy resin in an amount if 7.4% by weight. As the activator, 1.2% by weight of adipic acid and 0.3% by weight of propylamine hydrochloride were used, and as the solvent, 10% by weight of toluene and 70% by weight of isopropyl alcohol were used. These components were uniformly mixed and dissolved to obtain a flux of Example 15. The non-tackiness, spreading ratio, insulation resistance, corrosion resistance and solderability of the flux, the crosslinking degree of the flux film and the chlorine content in the film were tested. The non-tackiness, spreading ratio, insulating property and corrosion resistance were determined according to JIS Z-3197. At the solderability test, a paper-phenolic substrate (90 mm ×135 mm) was soldered by a jet soldering apparatus, and defects were checked by visual observation. At the test for determining the crosslinking degree of the film,

TABLE 3

| | | Example No. | | | | | Comparative Example No. |
| --- | --- | --- | --- | --- | --- | --- | --- |
| | | 10 | 11 | 12 | 13 | 14 | 3 |
| Composition (% by weight) of Flux | 1) acrylic resin | 18.5 | 11.1 | 11.1 | 11.1 | — | — |
| | 2) styrene-maleic acid resin | — | — | — | — | 11.1 | — |
| | disproportionated rosin | — | 7.4 | 7.4 | 7.4 | 7.4 | 18.5 |
| | adipic acid | 1.2 | 1.2 | 1.2 | 1.2 | 1.2 | 1.2 |
| | propylamine hydrochloride | 0.3 | 0.3 | 0.3 | 0.3 | 0.3 | 0.3 |
| | 2-ethylhexyl methacrylate | 4.8 | 4.8 | — | — | 4.8 | — |
| | benzyl methacrylate | — | — | 4.8 | — | — | — |
| | ethylene glycol dimethacrylate | — | — | — | 4.8 | — | — |
| | isopropyl alcohol | 75.2 | 75.2 | 75.2 | 75.2 | 75.2 | 80.0 |
| Test Results | non-tackiness | no cloth trace | no cloth trace | no cloth trace | no cloth trace | no cloth trace | large cloth trace |
| | spreading ratio (%) | 91 | 94 | 92 | 93 | 93 | — |
| | insulation resistance ($\Omega$) initial stage | $7 \times 10^{12}$ | $8 \times 10^{12}$ | $5 \times 10^{12}$ | $6 \times 10^{12}$ | $4 \times 10^{12}$ | $5 \times 10^{10}$ |
| | 50 hrs. | $6 \times 10^{12}$ | $6 \times 10^{12}$ | $4 \times 10^{12}$ | $3 \times 10^{12}$ | $3 \times 10^{12}$ | $5 \times 10^{8}$ |
| | 500 hrs. | $6 \times 10^{12}$ | $6 \times 12^{12}$ | $3 \times 10^{12}$ | $3 \times 10^{12}$ | $1 \times 10^{12}$ | $6 \times 10^{7}$ |
| | corrosion resistance 50 hrs. | no corrosion | no corrosion | no corrosion | no corrosion | no corrosion | pitting corrosion |
| | 500 hrs. | no corrosion | no corrosion | no corrosion | no corrosion | no corrosion | |
| | solderability (defect ratio. %) | below 1 | below 1 | below 1 | below 1 | below 1 | below 1 |
| | chlorine content (%) in residue before soldering | 0.54 | 0.54 | 0.54 | 0.53 | 0.54 | 0.55 |
| | after soldering | 0.1> | 0.1> | 0.1> | 0.1> | 0.1> | 0.43 |

As apparent from the results shown in Table 3, according to the third aspect of the present invention, a a flux-coated copper sheet (100 mm ×200 mm) was heated by a hot plate, the coated copper plate was extracted with acetone, the dry weight of the insoluble component was measured and the gel proportion (%) was calculated. The chlorine content in the film was determined according to JIS Z-3197 after extraction of the soluble component with methanol.

In Example 16, 7.8% by weight of an acrylic resin having an acid value of 100 was used as the carboxyl group-containing resin, and 5.2% by weight of bisphenol A diglycidyl ether was used as the epoxy resin. Furthermore, 5.5% by weight of disproportionated rosin was used. The same activators and solvents as used in Example 15 were used in the same amounts as used in Example 15. These components were uniformly mixed and dissolved to obtain a flux of Example 16. The flux was tested in the same manner as described in Example 15, and the results are shown in Table 4.

In Example 17, 11.1% by weight of an acrylic resin having an acid value of 60 was used as the carboxyl group-containing resin and 7.4% by weight of bisphenol A diglycidyl ether was used as the epoxy resin. The same activators and solvents as used in Example 15 were used in the same amounts as described in Example 15. These components were uniformly mixed and dissolved to obtain a flux of Example 17. The flux was tested in the same manner as described in Example 15, and the results are shown in Table 4.

In Example 18, 13.0% by weight of an acrylic resin having an acid value of 60 and an epoxy equivalent of 300 was used as the resin containing carboxyl and epoxy groups, and 5.5% by weight of disproportionated rosin was used. The same activators and solvents as used in Example 15 were used in the same amounts as described in Example 15. These components were uniformly mixed and dissolved to obtain a flux of Example 18. The flux was tested in the same manner as described in Example 15, and the results are shown in Table 4.

COMPARATIVE EXAMPLE 4

In Comparative Example 4, disproportionated rosin was used in an amount of 18.5% by weight, and the same activators and solvents as used in Example 15 were used in the same amounts as described in Example 15. These components were uniformly mixed and dissolved to obtain a flux of Comparative Example 4. The flux was tested in the same manner as described in Example 15, and the results are shown in Table 4.

TABLE 4

|  |  | Example No. 15 | Example No. 16 | Example No. 17 | Example No. 18 | Comparative Example No. 4 |
| --- | --- | --- | --- | --- | --- | --- |
| Compounds (% of weight) of Flux | carboxyl group-containing resin | 11.1 | 7.8 | 11.1 | — | — |
|  | epoxy resin | 7.4 | 5.2 | 7.4 | — | — |
|  | resin containing carboxyl and epoxy groups | — | — | — | 13.0 | — |
|  | disproportionated rosin | — | 5.5 | — | 5.5 | 18.5 |
|  | adipic acid | 1.2 | 1.2 | 1.2 | 1.2 | 1.2 |
|  | propylamine hydrochloride | 0.3 | 0.3 | 0.3 | 0.3 | 0.3 |
|  | toluene | 10.0 | 10.0 | 10.0 | 10.0 | 10.0 |
|  | isopropyl alcohol | 70.0 | 70.0 | 70.0 | 70.0 | 70.0 |
| kind of carboxyl group-containing resin |  | acrylic resin having acid value of 100 | acrylic resin having acid value of 100 | acrylic resin having acid value of 60 | — | — |
| kind of epoxy resin |  | bisphenol A diglycidyl ether | bisphenol A diglycidyl ether | bisphenol A diglycidyl ether | — | — |
| kind of resin containing carboxyl and epoxy groups |  | — | — | — | acrylic resin having acid value of 60 and equivalent of 300 | — |
| Test Results | non-tackiness | no cloth trace | no cloth trace | no cloth trace | no cloth trace | large cloth trace |
|  | spreading ratio (%) | 93 | 95 | 93 | 94 | 95 |
|  | insulation resistance ($\Omega$) initial stage | $7 \times 10^{12}$ | $3 \times 10^{12}$ | $4 \times 10^{12}$ | $6 \times 10^{12}$ | $6 \times 10^{10}$ |
|  | 50 hrs | $6 \times 10^{12}$ | $1 \times 10^{12}$ | $2 \times 10^{12}$ | $5 \times 10^{12}$ | $4 \times 10^{8}$ |
|  | 500 hrs | $6 \times 10^{12}$ | $1 \times 10^{12}$ | $2 \times 10^{12}$ | $4 \times 10^{12}$ | $5 \times 10^{7}$ |
| Test Results | corrosion resistance 50 hrs | no corrosion | no corrosion | no corrosion | no corrosion | pitting |
|  | 500 hrs | no corrosion | no corrosion | no corrosion | no corrosion | corrosion |
|  | solderability (defect ratio, %) | below 1 | below 1 | below 1 | below 1 | below 1 |
|  | crosslinking degree of firm | 42 | 30 | 48 | 38 | 0 |
|  | chlorine content (%) in residue before soldering | 0.55 | 0.55 | 0.55 | 0.55 | 0.55 |
|  | after soldering | 0.1> | 0.1> | 0.1> | 0.1> | 0.48 |

As apparent from the results shown in Table 4, in each of the foregoing examples, a soldering flux having an excellent insulating property and corrosion resistance was obtained.

Furthermore, if the process of the foregoing examples is adopted, since the flux residue left after soldering need not be washed away, the washing step can be omitted, the cost can be reduced, and an environmental pollution with flon or the like can be prevented.

The flux of the present invention is valuable as a solder flux for jet soldering, paste soldering and the like.

INDUSTRIAL APPLICABILITY

Even if the soldering flux of the present invention is exposed in a high-temperature atmosphere maintained at a level not lower than 80° C., such as an atmosphere in an engine room of an automobile, problems such as a corrosion of the metal surface do not arise, and accordingly, the washing step can be omitted and the running cost of the soldering step can be reduced, and an environmental pollution with a flon detergent does not occur. Accordingly, the flux of the present invention is valuable for use when soldering on an industrial scale, especially for automobiles.

What is claimed is:

1. A soldering flux comprising at least (a) a thermoplastic synthetic resin having a softening point not lower than 80° C. and (b) an activator.

2. A soldering flux as set forth in claim 1, wherein the thermoplastic resin is an acrylic resin and/or a styrene-maleic acid resin obtained by polymerizing or copolymerizing a monomer having a polymerizable unsaturated group.

3. A soldering flux as set forth in claim 1, which comprises 0.5 to 80% by weight of the thermoplastic resin and 0.1 to 20% by weight of the activator.

4. A soldering flux comprising at least (a) at least one compound selected from the group consisting of epoxy group-containing compounds, radical-polymerizable unsaturated double bond-containing compounds and blocked isocyanate group-containing compounds and (b) an activator.

5. A soldering flux as set forth in claim 4, which comprises 1 to 70% by weight of at least one compound selected from the group consisting of epoxy group-containing compounds, radical-polymerizable unsaturated double bond-containing compounds and blocked isocyanate compounds, and 0.1 to 30% by weight of the activator.

6. A soldering flux comprising at least (a) a thermoplastic resin having a softening point not lower than 80° C., (b) at least one compound selected from the group consisting of epoxy group-containing compounds, radical-polymerizable unsaturated double bond-containing compounds and blocked isocyanate group-containing compounds, and (c) an activator.

7. A soldering flux as set forth in claim 6, which comprises 0.5 to 80% by weight of the thermoplastic resin, at least 1% by weight of said at least one compound and 0.1 to 30% by weight of the activator.

8. A soldering flux comprising at least one thermosetting resin selected from the group consisting of a thermosetting resin composed of a mixture of a carboxyl group-containing resin and an epoxy resin and a thermosetting resin having a carboxyl group and an epoxy group, and an activator.

9. A soldering flux as set forth in claim 8, which comprises 0.5 to 70% by weight of the thermosetting resin and 0.1 to 30% by weight of the activator.

* * * * *